United States Patent [19]
Nishikawa

[11] Patent Number: 5,686,976
[45] Date of Patent: Nov. 11, 1997

[54] LIQUID CRYSTAL DISPLAY WITH STORAGE CAPACITORS FOR HOLDING ELECTRIC CHARGES

[75] Inventor: Ryuji Nishikawa, Gifu, Japan

[73] Assignee: Sanyo Electric Co., Ltd., Osaka, Japan

[21] Appl. No.: 516,098

[22] Filed: Aug. 17, 1995

[30] Foreign Application Priority Data

Nov. 11, 1994 [JP] Japan .................... 6-277699

[51] Int. Cl.$^6$ .................... G02F 1/1343; G02F 1/136
[52] U.S. Cl. .................... 349/38; 349/42; 349/39
[58] Field of Search .................... 359/59, 87, 88, 359/57; 349/42, 38, 39, 139, 148

[56] References Cited

U.S. PATENT DOCUMENTS

| | | | |
|---|---|---|---|
| 4,563,806 | 1/1986 | Coissard et al. | 433/54 |
| 5,151,806 | 9/1992 | Kawamoto et al. | 359/59 |
| 5,182,661 | 1/1993 | Ikeda et al. | 359/54 |
| 5,337,173 | 8/1994 | Atsumi et al. | 359/54 |
| 5,394,258 | 2/1995 | Morin et al. | 359/59 |
| 5,459,596 | 10/1995 | Ueda et al. | 359/87 |
| 5,483,082 | 1/1996 | Takizawa et al. | 257/59 |
| 5,517,341 | 5/1996 | Kim et al. | 359/59 |
| 5,517,342 | 5/1996 | Kim et al. | 359/59 |

FOREIGN PATENT DOCUMENTS 59-232385  12/1984  Japan .

*Primary Examiner*—William L. Sikes
*Assistant Examiner*—Toan Ton
*Attorney, Agent, or Firm*—Loeb & Loeb LLP

[57] ABSTRACT

An active matrix type liquid crystal display comprises pixel electrodes corresponding to respective pixels and storage capacitor electrodes which are disposed lying adjacent to each pixel electrode, with an insulation layer interposed therebetween. Input terminal electrodes are positioned at ends of a TFT substrate. An input capacitor is constituted by one storage capacitor electrode and one input terminal electrode which are positioned at opposite sides of the insulating layer interposed therebetween. Input capacitors are connected in series with the storage capacitor. A voltage of the storage capacitor electrode is controllable in response to a signal to the input terminal electrode as desired. The storage capacitor electrode and input terminal electrode can be shorted by irradiating a laser. In either case, it is not necessary to make a contact hole on an insulation layer using a dedicated mask so as to connect the input terminal electrode and storage capacitor electrode to the insulation layer. Thus, it is possible to reduce the number of masks to be used during the manufacturing process.

28 Claims, 11 Drawing Sheets

LIQUID CRYSTAL DISPLAY WITH STORAGE CAPACITORS FOR HOLDING ELECTRIC CHARGES

BACKGROUND OF THE INVENTION

1. Field of the Invention

This invention relates to a liquid crystal display which is realized by reducing the number of masks to be used in a manufacturing process, and more particularly to a liquid crystal display including dedicated storage capacitor electrodes.

2. Description of the Prior Art

Liquid crystal displays are advantageous in that they are thin and compact, and have low power consumption, and they have been in practical use in the fields of OA equipment, AV equipment and so on. Especially, active matrix type liquid crystal displays using thin film transistors (called "TFT" hereinafter) as switching elements can theoretically perform static drive at a duty ratio of 100% in a multiplexed manner, and are applicable for indicating motion AV images on a large display screen with high resolution.

The active matrix type liquid crystal display comprises a TFT substrate, on which TFTs are connected to a plurality of pixel electrodes arranged in matrix array, a substrate, which lies adjacent to the TFT substrate and includes an opposed electrode and is called an "opposed substrate" hereinafter, and a liquid crystal layer sealed between the foregoing two substrates, which are joined.

Each TFT functions as a switching element for selecting a data signal input to each pixel electrode, and includes a gate electrode, a drain electrode, a source electrode, and a non-monocrystal semiconductor layer. The foregoing electrodes are connected to a gate line, a drain line, and the pixel electrode, respectively. The non-monocrystal semiconductor layer is made of amorphous silicon (a-Si) or polysilicon (p-Si) and functions as a channel layer. The gate lines of the liquid crystal display are sequentially scanned one by one so as to actuate all the TFTs on every scanning line (gate line). In synchronization with the actuation of the TFTs, data signals are sent via drain lines to the pixel electrodes associated with the actuated TFTs. The opposed electrode has a voltage which is determined in synchronization with a scanning signal to the gate line. In accordance with a voltage between the opposed electrode and pixel electrodes lying adjacent therewith, each liquid crystal capacitor between the pixel electrodes and the opposed electrode is actuated. Thereafter, light transmittance is adjusted for each pixel so as to display an image as desired.

Conversely, the liquid crystal during OFF of TFTs is held in a shift state by liquid crystal capacitors between the opposed electrode and pixel electrodes. When a storage capacitor is inserted in parallel with the liquid crystal capacitor on each pixel, it is possible to improve the display data signal holding performance of the pixel electrodes. Further, the storage capacitors are effective in suppressing shifts of potentials of the pixel electrodes when the TFTs are actuated. In other words, since it is inevitable that the source and drain electrodes are put over each other due to restrictions in a manufacturing process, parasitic capacitance may appear. To overcome this problem, the storage capacitors are inserted in parallel with the liquid crystal capacitors, thereby increasing total capacitance and protecting the potential of pixel electrodes against being affected by a DC component caused by the parasitic capacitance, and improving holding of applied electric charges.

Referring to the accompanying drawings, an example of conventional liquid crystal displays comprises a plurality of pixels, each of which includes a TFT, a liquid crystal capacitor, and a storage capacitor. The TFTs structure is staggered. In the liquid crystal display, gate electrodes are arranged on an a-Si layer so as to constitute a-Si TFTs. FIG. 1 shows an equivalent circuit on a TFT substrate. Gate lines G1–Gm and drain lines D1–Dm are arranged such that they are orthogonal to one another. TFTs S11–Smn, of which gate and drain electrodes are disposed at cross points of the gate and drains lines, are connected to their associated gate and drain lines. In each pixel, the liquid crystal capacitor and the storage capacitor have two electrodes. One electrode of the liquid crystal capacitor is a source electrode (i.e. pixel electrode) of each of the TFTs (S11–Smn), and the other is the opposed electrode on the substrate, not shown. Likewise, one electrode of the storage capacitor is the source electrode of each of the TFTs (S11–Smn), and the other is a storage capacitor electrode. The storage capacitor electrodes are connected, using storage capacitor lines SL1–SLm, to lead lines (CL) via contact holes (CT). One end of each lead line (CL) serves as an input terminal (SP) for each storage capacitor. The input terminal (SP) is connected, using silver paste, to the opposed electrode of the opposed substrate.

FIG. 2 is a cross section of a pixel. Each pixel comprises a light shielding film 11, a storage capacitor electrode 12S, and a storage capacitor line (not shown), all of which are patterned, using Cr, on a transparent substrate 10. The transparent substrate 10 is covered by an $SiN_x$ insulation layer 13. A pixel electrode 14P, a source electrode (14S), a drain electrode 14D and a drain line 14L are deposited on the insulation layer 13 using ITO (indium tin oxide). On the source and drain electrodes 14S and 14D are stacked an a-Si layer 17, a gate insulating layer 18, a gate electrode 19G one on the other, thereby forming a TFT. The gate insulating layer 18 is made of a material such as $SiN_x$. The gate electrode 19G is made of Al and is integral with the gate line. The a-Si layer 17 and the gate insulating layer 18 have patterns similar to those of the gate line and the gate electrode 19G. These patterns are formed by depositing a-Si, $SiN_x$ and Al one on the other, which are then etched using one mask.

An ohmic contact between the a-Si layer 17 and the source and drain electrodes 14S, 14D is made as follows. When preparing source and drain lines using ITO as a material, ITO added with 5-group elements, such as phosphor, is used as a target, which is then sputtered. Then, the a-Si layer is formed on the ITO layer using the plasma CVD method. Phosphor in the ITO layer is diffused into the a-Si layer, so an $N^+$-type contact layer is formed at a boundary between ITO and a-Si.

FIG. 3 is a cross section taken along line 1X–1X' of FIG. 2, showing an area outside a display region of the TFT substrate. In other words, the portion of the storage capacitor line 12L covered by the insulation layer 13 is connected to a member external to the TFT substrate. A storage capacitor input electrode 16 is formed by patterning ITO at the same time that the source and drain electrodes 14S and 14D are formed. Further, the storage capacitor input electrode 16 is connected to the storage capacitor line 12L via a contact hole CT 20 on the insulation layer 13.

With the conventional TFT substrate, at least four masks are required, i.e. one for patterning the light shielding film 11 and the storage capacitor line 12L; one for making the contact hole 20 on the insulating layer 13; one for patterning the pixel electrode 14P, source electrode 14S, drain line 14L and drain electrode 14D; and one for patterning the gate line and gate electrode. Manufacturing cost depends upon the number of patterning masks, so it is advantageous to reduce the number of masks to be used.

FIG. 4 is an enlarged plan view showing a pixel of another conventional example. On a TFT substrate, gate lines 19L and drain lines 14L are arranged such that they intersect one another. A pixel electrode 14P is in an area defined by the gate and drain lines 19L and 14P. Each TFT is formed near an intersection of the gate and drain line, and includes a semiconductor layer, an insulation layer and a gate electrode 19G which are stacked one on the other at a channel region where source and drain electrodes 14S and 14D are arranged adjacent to each other. A storage capacitor electrode, made of a transparent conductive film such as ITO, covers most of the substrate. The storage capacitor electrode and the pixel electrode 14P are superimposed, thereby serving as a storage capacitor. A Cr light shielding layer 21 is under the TFTs and around the pixel electrodes 14P so as to prevent light beams not only from being incident onto the TFT from the rear side of the substrate, but also from leaking around the pixel electrode 14P.

FIG. 5 shows a cross section of the pixel, taken along line 4X–4X' in FIG. 4. The storage capacitor electrode 22 extends over most of the substrate 10 and is made of ITO. The Cr light shielding layer 21 extends over the storage capacitor electrode 22 except for an aperture. The insulating layer is made of SiN$_x$, and covers most of the storage capacitor 22 and the light shielding layer 21. The pixel electrode 14P made of ITO and the drain line 14L are on an insulation layer 13. Portions of the pixel electrode 14P and the drain line 14L, which are adjacent to each other, function as source and drain electrodes 14S and 14D for the TFT. The gate line 19L extends in a direction where it intersects with the drain line 14L. Under the gate line 19L intersecting with the drain line 14L, there are an a-Si layer 17 and a gate insulating layer 18 made of SiN$_x$ which is on the a-Si layer 17. A part of the gate line 19L extends over an area where source and drain electrodes are formed, thereby forming a TFT. A contact layer 17N, which is made of N$^+$-doped a-Si, is inserted between the source and drain electrodes 14S and 14D, and serves as an ohmic contact.

FIG. 6 is a cross section of one end of the substrate of FIG. 4, showing the structure of an input part of the storage capacitor electrode 22. The input terminal electrode 24 for the storage capacitor (called simply "input terminal electrode 24") is formed by patterning ITO together with the pixel and drain lines. As in the example shown in FIG. 3, the input terminal electrode 24 is connected to the storage capacitor electrode 22 via a contact hole 20 formed in the insulating layer 22 by a photo-etching process. The light shielding layer 21 made of ITO entirely covers the storage capacitor electrode 22 so as to reduce resistivity of the storage capacitor electrode 22. Referring to FIG. 6, the input terminal electrode 24 is connected to the storage capacitor electrode 22 in the contact hole 20 via the light shielding layer 21.

With the conventional TFT substrate in this example, at least four masks are required, i.e. one for patterning the light shielding layer 21; one for making the contact hole 20 in the insulating layer 13; one for patterning the pixel electrode, the source electrode, the drain line, the drain electrode, and the input terminal electrode 24; and one for patterning the gate line and the gate electrode. This means that four photo-etching processes are necessary. However, one photo-etching process comprises steps of pre-cleaning, applying photoresist, prebaking, exposing, developing, post-baking, etching, removing the photoresist, and post-cleaning, and consumes a lot of time. Therefore, it is necessary to reduce the number of photo-etching processes so as to reduce manufacturing cost.

SUMMARY OF THE INVENTION

This invention is intended to provide a liquid crystal display which can be manufactured at a reduced cost using a reduced number of masks, and includes storage capacitors for holding charges so as to assure improved image quality.

With a first aspect of the invention, there is provided a liquid crystal display comprising: a plurality of pixel electrodes arranged, on a substrate, in the shape of a matrix; drain lines formed between columns of the pixel electrodes; gate lines formed between rows of the pixel electrodes; thin film transistors formed near intersections of the drain lines and the gate lines, each thin film transistor including a source electrode connected to each pixel electrode, a drain electrode connected to each drain line, and a gate electrode connected to each gate line; storage capacitor electrodes disposed lying adjacent to the pixel electrodes with an insulation layer sandwiched therebetween; storage capacitors constituted by the pixel electrodes and the storage capacitor electrodes; and an input terminal electrode for the storage capacitors disposed at an end of the substrate. The storage capacitor electrodes extend to an end of the substrate such that the storage capacitor electrode is disposed lying adjacent to the input terminal electrodes with the insulation layer interposed therebetween. Further, voltages applied to the storage capacitor electrodes are controlled by signals supplied to the input terminal electrodes.

In the liquid crystal display, each of the gate lines carries the insulation layer and the semiconductor layer on its underside. Each source electrode is constituted by a part of each pixel electrode. Each drain electrode is constituted by a part of each drain line. A channel layer which is a part of the semiconductor layer and is positioned at an area where the source electrode and the drain electrode lie adjacent to each other. A gate insulation layer which is a part of the insulation layer extends over the channel layer. Each gate which is a part of the gate line extends over the gate insulation layer.

The input terminal electrode is made of the same transparent conductive layer constituting the pixel electrodes and the drain lines.

One storage capacitor electrode is provided for each pixel electrode. Each storage capacitor electrode is connected to an opposed capacitor electrode present on one end of the substrate, and the input capacitor is constituted by the common capacitor electrode and the input terminal electrode which is formed on the common capacitor electrode via the insulation layer.

In the foregoing arrangement, the input capacitor is connected in series with the storage capacitor. Thus, a signal to the input terminal electrode is supplied thereto via the input capacitor, so a voltage of the storage capacitor electrode is controlled in accordance with the signal. It is not necessary to make a contact hole in the insulation layer using a mask therefor.

The input capacitor constituted by the storage capacitor electrode and the input terminal electrode has a capacitance which is 1/10 of the total capacitance of all the storage capacitors on the substrate. Therefore, the voltage of the storage capacitor electrode can be controlled as desired in accordance with the signal applied to the input terminal electrode.

The input terminal electrode is disposed at a corner or a side of the substrate, or both a corner and a side of the substrate. The input terminal electrode and the input capacitor can be disposed without reducing a display area.

Each storage capacitor electrode is disposed lying adjacent to each pixel electrode with the insulation layer interposed therebetween around a peripheral edge of the pixel electrode, and storage capacitor electrodes which are on the same rows and columns of pixel electrodes adjoining each other are mutually connected. It is possible to lower line resistance of the storage capacitor. As a signal is applied from the input terminal electrode, a voltage of the storage capacitor electrode is quickly controlled in response thereto. The storage capacitor electrode is constituted by a part of a light shielding layer on the substrate. Further, the storage capacitor can be made together with the light shielding layer, and it is possible to reduce the number of masks used for this process.

The storage capacitor electrodes may be made of a transparent conductive layer extending all over the substrate. The storage capacitor electrodes do not substantially lower transmittivity of the liquid crystal display. Further, since the storage capacitor electrodes extend all over the pixel electrode via the insulating layer, it is possible to increase the capacitance of the storage capacitor. No mask is used for the storage capacitor electrodes.

In accordance with a second aspect of the invention, there is provided a liquid crystal display comprising: a plurality of pixel electrodes arranged, on a substrate, in matrix array; drain lines formed between columns of the pixel electrodes; gate lines formed between rows of the pixel electrodes; thin film transistors formed near intersections of the drain lines and the gate lines, each thin film transistor including a source electrode connected to the pixel electrode, a drain electrode connected to the drain line, and a gate electrode connected to the gate line; storage capacitor electrodes disposed lying adjacent to the pixel electrodes with an insulation layer sandwiched therebetween; and storage capacitors constituted by the pixel electrodes and the storage capacitor electrodes. The storage capacitor electrodes extend to an end of the substrate where the storage capacitor electrode is disposed lying adjacent to the input terminal electrode with the insulation layer interposed therebetween. The input terminal electrode and the storage capacitor electrode are shorted, and voltages applied to the storage capacitor electrodes are controlled by signals supplied to the input terminal electrodes. Thus, it is possible to directly control a voltage of the storage capacitor electrode by applying a desired signal to the input terminal electrode. In other words, applying a given current to the input terminal electrode, charges can be directly supplied to the storage capacitor electrode, and a voltage of the storage capacitor electrode can be controlled accordingly. Further, an electric field effect is caused by a capacitance component due to overlapping of the storage capacitor electrode and the input terminal electrode. Thus, it is possible to control the voltage of the storage capacitor electrode using this electric field effect.

In this arrangement, each gate line carries the insulation layer and the semiconductor layer on its underside. Each source electrode is constituted by a part of each pixel electrode. Each drain electrode is constituted by a part of each drain line. A channel layer which is a part of the semiconductor layer and is positioned at an area where the source electrode and the drain electrode lie adjacent to each other. A gate insulation layer which is a part of the insulation layer and extends over the channel layer.

The input terminal electrode and the storage capacitor electrode are shorted so as to make a contact by a laser irradiated from a side of the input terminal electrode or the storage capacitor electrode after formation of the foregoing electrodes and the insulation layer. Thus, it is possible to connect the storage capacitor electrode and the input terminal electrode without making a contact hole in the insulating layer by the photo-etching process. One to several contacts are sufficient throughout the substrate, and they can be easily made by laser irradiation at a reduced cost.

A laminate of the semiconductor layer, the insulation layer and the gate line is laid over the input terminal electrode, and the input terminal electrode and the storage capacitor electrode are shorted at a part of the laminate.

The input terminal electrode and the storage capacitor electrode are shorted by a laser irradiated from a side of the laminate or from a side of the storage capacitor electrode.

A light shielding layer is formed on the storage capacitor electrodes around each pixel electrode. The light shielding layer is connected to the storage capacitor electrode and extends to the end of the substrate where the laminate is present over the input terminal electrode, and the input terminal electrode and the storage capacitor electrode are shorted where the laminate and the light shielding layer are formed.

When the input terminal electrode and the storage capacitor electrode are shorted at the position where the laminate or the light shielding layer, or both of them are provided, metal components in the laminate or the light shielding layer are fused by laser irradiation, and produce a contact metal at the shorted area. For instance, when the input terminal electrode is subject to laser irradiation via the laminate, metal components in the laminate are fused by laser and increase an amount of metal at the shorted area, compared with when only the input terminal electrode is irradiated and fused. On the other hand, when the input terminal electrode is irradiated via the storage capacitor electrode, metal components in the light shielding layer are melted, thereby increasing an amount of metal at the shorted area. Thus, it is possible to prevent an insufficient amount of metal components at the shorted area, and assure good contact. Further, presence of the laminate or the light shielding layer thickens the area to be shorted, and can prevent the substrate from also being shorted by laser irradiation.

The shorted portion of the input terminal electrode and the storage capacitor electrode is present at an area where the substrate and another substrate are put together by an adhesive, inside an area where two substrates are bonded by an adhesive, or at a protection layer outside of the adhesive. The shorted portion is a relatively thin conductive layer. Therefore, when its metal contact is exposed to moisture, it is corroded due to cell action. To overcome this problem, the shorted portion is protected against the atmosphere, thereby preventing aging, poor connection, or line breakage of the shorted portion.

The storage capacitor electrodes are constituted by a transparent conductive layer laid over the substrate. In this case, when the storage capacitor electrode and the input terminal electrode are shorted, it is possible to directly control the voltage of the storage capacitor electrode by applying a desired signal to the input terminal electrode. Thus, even when the storage capacitor has a large capacitance, it is possible to sufficiently suppress delay of a signal for controlling the storage capacitor electrode.

In the foregoing arrangement, a laminate is present over the input terminal electrode and a light shielding layer is provided over the storage capacitor electrode. The input terminal electrode and the storage capacitor electrodes are shorted where the laminate or the light shielding layer is present, by irradiating a laser via the storage capacitor electrode or the laminate.

Thus, many layers are present at the area to be shorted, so the shorted area can be made without penetrating all of these layers. Further, a necessary amount of metal components is available at a portion where the input terminal electrode and the storage capacitor electrode are shorted. Thus, it is possible to improve reliability of the shorted portion.

BRIEF DESCRIPTION OF THE DRAWINGS

The invention will be described in greater detail with reference to the accompanying drawings, wherein.

DESCRIPTION OF THE PREFERRED EMBODIMENTS

Figure 7:
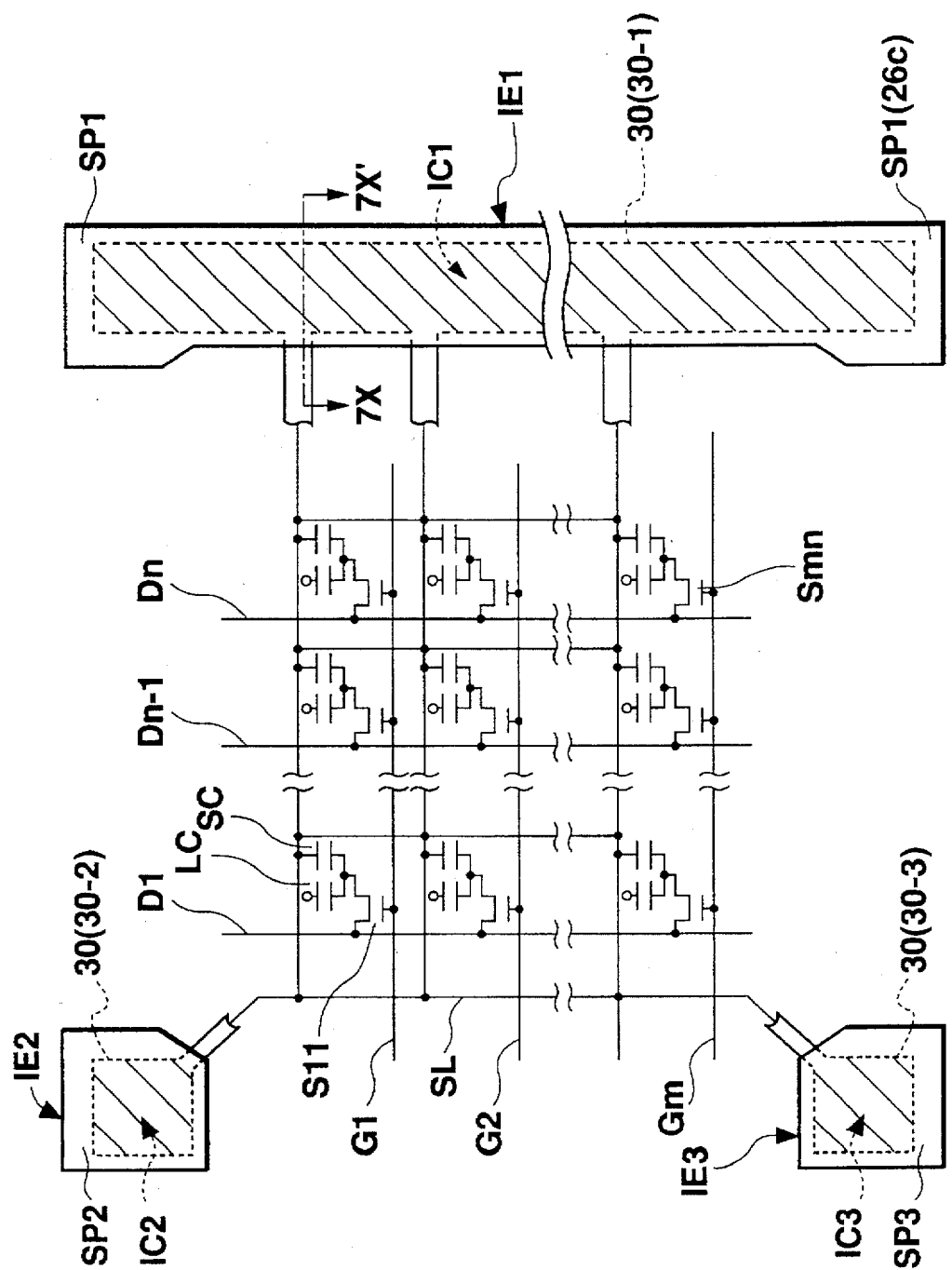
FIG. 7 is a schematic view showing the configuration of a liquid crystal display according to a first embodiment of the invention.

Embodiment 1:

The invention will be described with reference to a first embodiment shown in FIG. 7. Identical members have identical reference numbers to those mentioned with respect to the conventional examples, and will not be detailed hereinafter. Referring to FIG. 7, a liquid crystal display comprises a plurality of pixels, each of which includes a TFT, a liquid crystal capacitor, and a storage capacitor. Gate lines G1–Gm and drain lines D1–Dn are arranged such that they are orthogonal to one another. TFTs S11–Smn are formed at intersections of the gate and drain lines, and have their gate and drain electrodes connected to the gate and drain lines G1–Gm and D1–Dn, respectively. In each pixel, the liquid crystal capacitor and the storage capacitor have two electrodes, respectively. One electrode of the liquid crystal capacitor is a source electrode of each of the TFTs (S11–Smn), and the other is an opposed electrode on an opposed substrate (not shown) lying adjacent to the TFT substrate. Likewise, one electrode of the storage capacitor SC is the source electrode of each of the TFTs (S11–Smn), and the other is a storage capacitor electrode.

The storage capacitor electrodes of a given pixel are connected, via a storage capacitor line SL, to storage capacitor electrodes of pixels which are adjacent to the first-mentioned pixel on the same row and column.

The storage capacitor lines extend to opposite ends of the TFT substrate where the capacitor lines are connected to common capacitor electrodes 30 (30-1, 30-2 and 30-3). The common capacitor electrodes 30 (30-1, 30-2, 30-3) and input terminal electrode IE1–IE3 constitute capacitors IC1, IC2, IC3 for the storage capacitors (called "input capacitors IC1, IC2, IC3"). The input capacitors IC1–IC3 lie adjacent to the common capacitor electrodes via an insulation layer 13 inserted therebetween. Input terminals SP1, SP2, SP3 are provided at ends of the input terminal electrodes IE1–IE3, i.e. at four corners of the substrate, and are connected, using a silver paste, to the opposed electrodes on the opposed substrate, not shown. In the foregoing arrangement, when a voltage signal is applied to the capacitor input terminals SP1, SP2, SP3, a voltage depending upon the voltage signal is applied to storage capacitor electrodes of the pixels via the input capacitors IC1–IC3.

Figure 1:
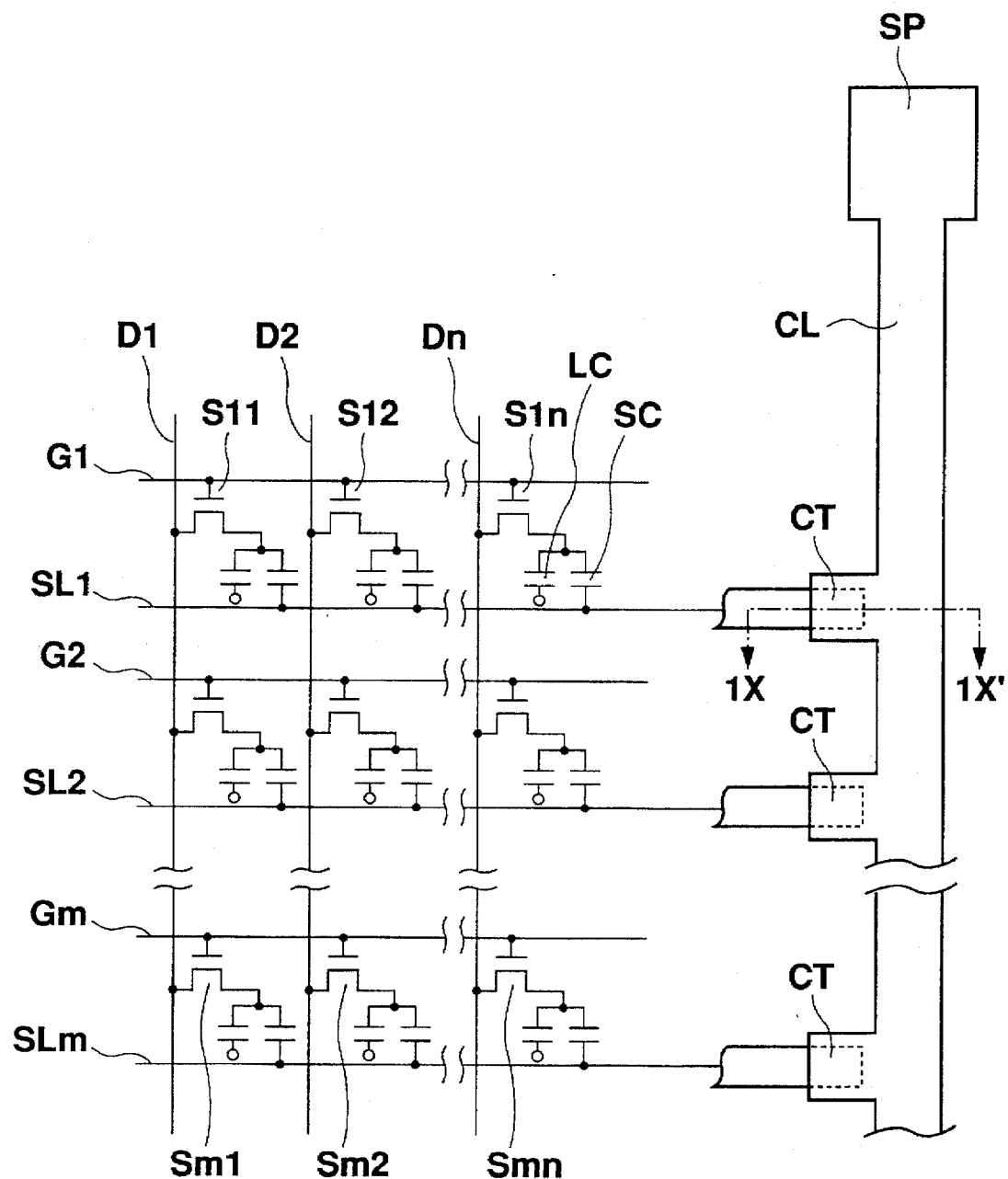
FIG. 1 is a schematic view showing the configuration of a conventional liquid crystal display.
Figure 2:
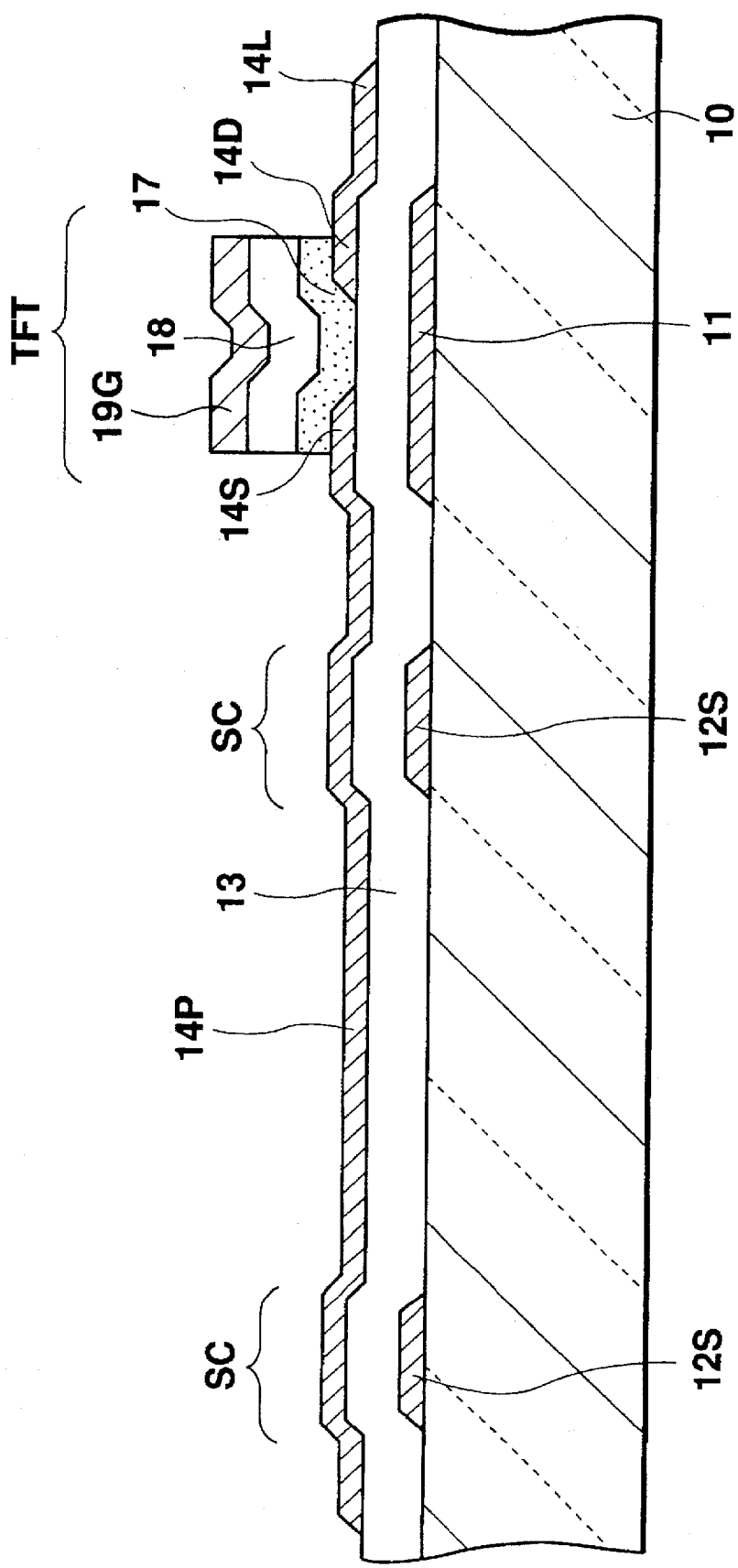
FIG. 2 is a cross section of one of the pixels of the liquid crystal display shown in FIG. 1.
Figure 3:
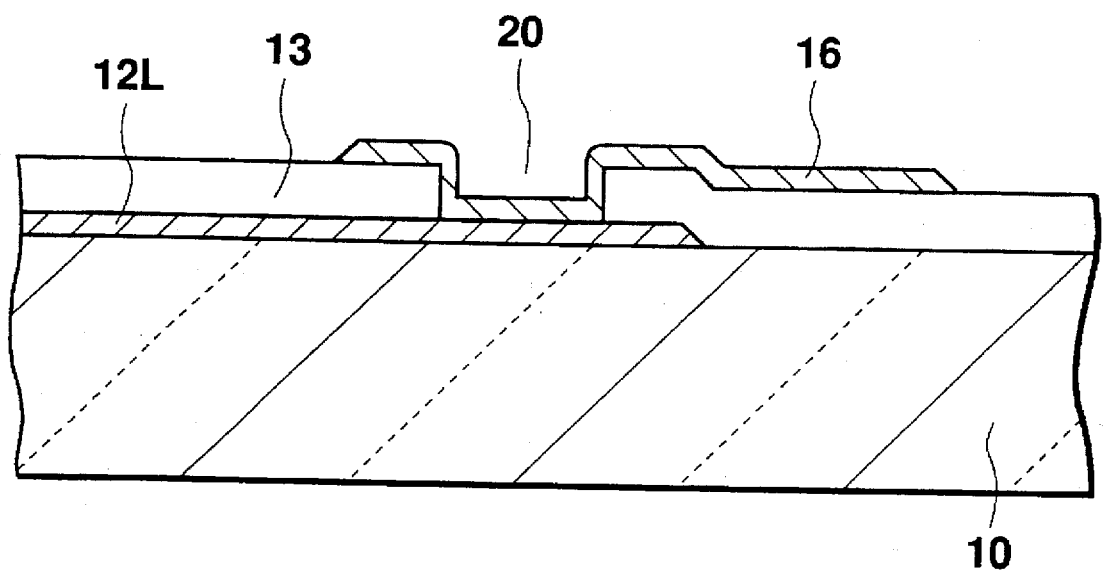
FIG. 3 is a cross section taken along line 1X–1X' shown in FIG. 1.
Figure 8:
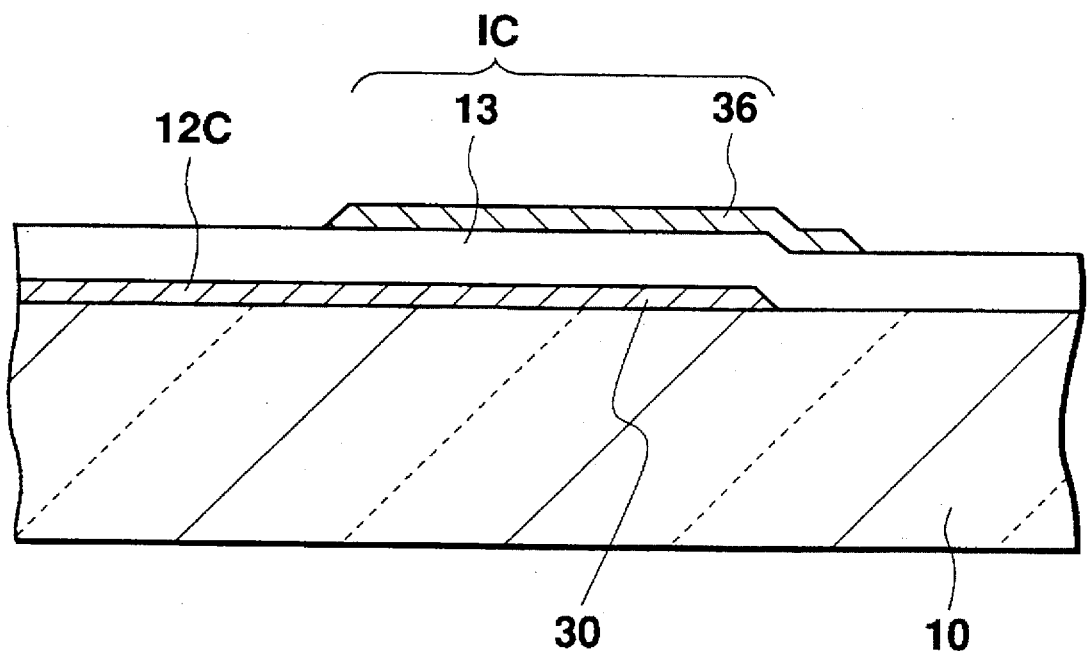
FIG. 8 is a cross section taken along line 7X–7X' in FIG. 7.
Figure 9:
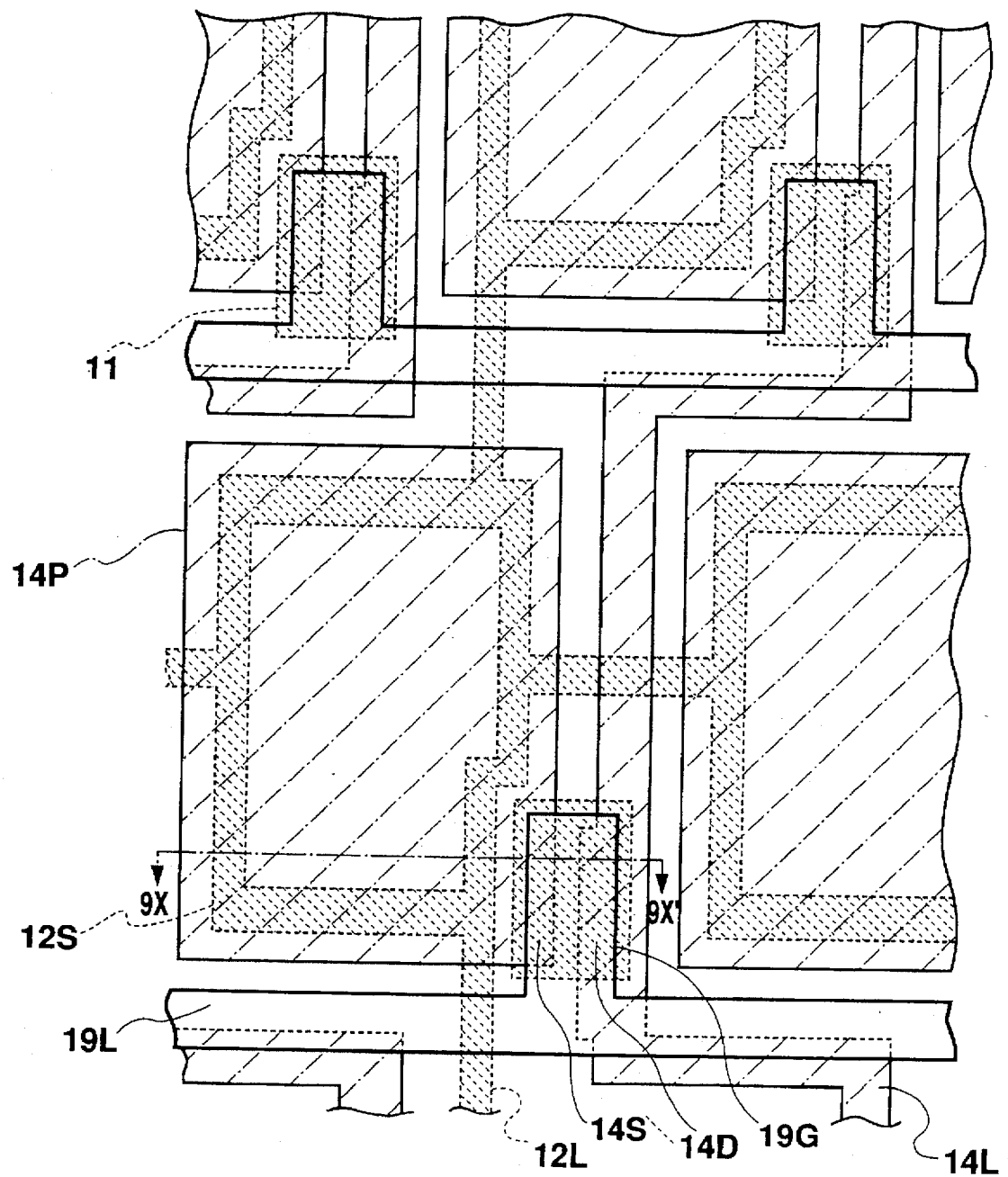
FIG. 9 is a schematic plan view showing the configuration of a TFT substrate of the liquid crystal display of FIG. 7.

This embodiment will be described in detail with reference to FIG. 8 which is a cross section of the input capacitors used in the liquid crystal display of a matrix type shown in FIG. 7, and FIG. 9 which is an enlarged plan view, taken along line 7X–7X', showing the configuration of the matrix type liquid crystal display. Specifically, FIG. 9 shows a triangle array structure in which respective pixels are displaced by a half pitch per row. Each TFT, which is at an area shown by line 9X–9X' in FIG. 9, is structured similarly to TFTs of the conventional crystal liquid displays. Identical parts have identical reference numbers as those shown in FIG. 2.

On a transparent glass substrate 10 are formed a light shielding film 11, a storage capacitor electrode 12S, and storage capacitor lines 12L for connecting the storage capacitor electrode 12S, and a lower electrode 30 of the input capacitors IC, all of which are formed by Cr sputtering and photo-etching processes. In this embodiment, the storage capacitor lines 12L are arranged in the row and column directions such that storage capacitor electrodes 12S can be connected in both row and column directions so as to suppress a signal delay by lowering a line resistance.

$SiN_x$ is deposited by the CVD process so as to form the insulation layer 13, which covers the foregoing elements and functions to insulate a plurality of layers and serves as a dielectric layer for the input capacitor. On the insulation layer 13, are formed a pixel electrode 14P, a source electrode 14S, a drain electrode 14D, and a drain line 14L, by ITO sputtering and photo-etching for ITO. At an end of the substrate, an upper electrode 36 (the input terminal electrode) is disposed such that it lies adjacent to a lower electrode 30. A part of the upper electrode 36 serves as the input terminal SP.

When preparing ITO by sputtering, ITO added with a 5-group element such as phosphor is used as a target such that the source and drain electrodes and lines contain phosphor.

An a-Si layer 17, a gate insulating layer 18 and a gate electrode 19G are deposited one on the other on the source and drain electrodes 14S and 14D. Each TFT is formed in the foregoing layers. The gate electrode 19G is integral with a gate line 19L, and is made of Al or the like. The gate insulating layer 18 is made of $SiN_x$, for example. The a-Si, $SiN_x$ and Al layers are deposited one on the other, and are substantially identically patterned using one mask.

The plasma CVD process is used to form the a-Si layer. Phosphor contained in ITO is diffused into the a-Si layer while it is being formed, thereby making an $N^+$-type ohmic contact at a boundary between ITO and the a-Si layer.

In this embodiment, the input capacitor IC1 is located at a side of the TFT substrate, and the input capacitors IC2 and IC3 are at two corners which are at the side opposite to the foregoing side and where the gate lines G1–Gm come out of the TFT substrate, as shown in FIG. 7. The input capacitors IC1–IC3 are disposed such that they do not adversely affect terminals for connecting the gate lines to a member external of the TFT substrate. It has been experimentally ascertained that the input capacitors IC1–IC3 are required to have a minimum capacitance which is one-tenth or more of the total capacitance of the storage capacitors on the substrate. With this embodiment, the input capacitors IC1–IC3 are designed to have approximately one-half the total storage capacitance. This capacitance value is approximately the maximum capacitance which can be produced on margins at the two ends of the substrate. Thus, such a capacitance value enables signals to be transmitted substantially without delay or loss when a voltage is applied to the storage capacitors via the input capacitors. Further, the storage capacitor lines SL are arranged in the matrix array, i.e. a storage capacitor electrode 12S of a given pixel is connected to storage capacitor electrodes 12S of pixels which are adjacent to one another on the rows and columns, thereby preventing signals to the storage capacitors from being delayed due to line resistance.

With this embodiment, a signal voltage is applied from the storage capacitor terminal SP to the storage capacitor line 12L via the input capacitors IC1–IC3. Since the storage capacitor line 12L is floating and is free of charge, and since the input capacitors IC1–IC3 and the storage capacitor SC have constant capacitance, the lower electrode 30 of the input capacitors IC1–IC3 always behaves in voltage following the upper electrode 36 of the input capacitors IC1–IC3. Control of the voltage of the upper electrode 36 enables the voltage of the lower electrode 30 to be applied to signal voltage. Therefore, when a desired signal voltage is applied to the storage capacitor input terminal SP, the signal voltage is also applied to the storage capacitor line 12L.

The foregoing structure can dispense with contact holes on the insulation layer 13. Therefore, the number of masks necessary for manufacturing the TFT substrate is 3 at maximum; one for patterning the light shielding layer 11 and storage capacitor lines 12L; one for patterning the source and drain electrodes, and the upper electrode of the input capacitors IC1–IC3; and one for patterning the gate electrodes.

With the first embodiment, the input capacitors IC1–IC3 are electrically connected in series with the storage capacitors SC. Thus, a signal applied to the input terminal electrode of the storage capacitor SC (e.g. a signal voltage applied to the opposed electrodes on the opposed substrate) is supplied to the storage capacitor via the input capacitors IC1–IC3. It is not necessary to make, using a dedicated mask, contact holes on the insulation layer so as to connect the storage capacitor input terminal electrodes and the storage capacitors. This enable appropriate control of the voltage applied to the storage capacitor electrode.

Figure 10:
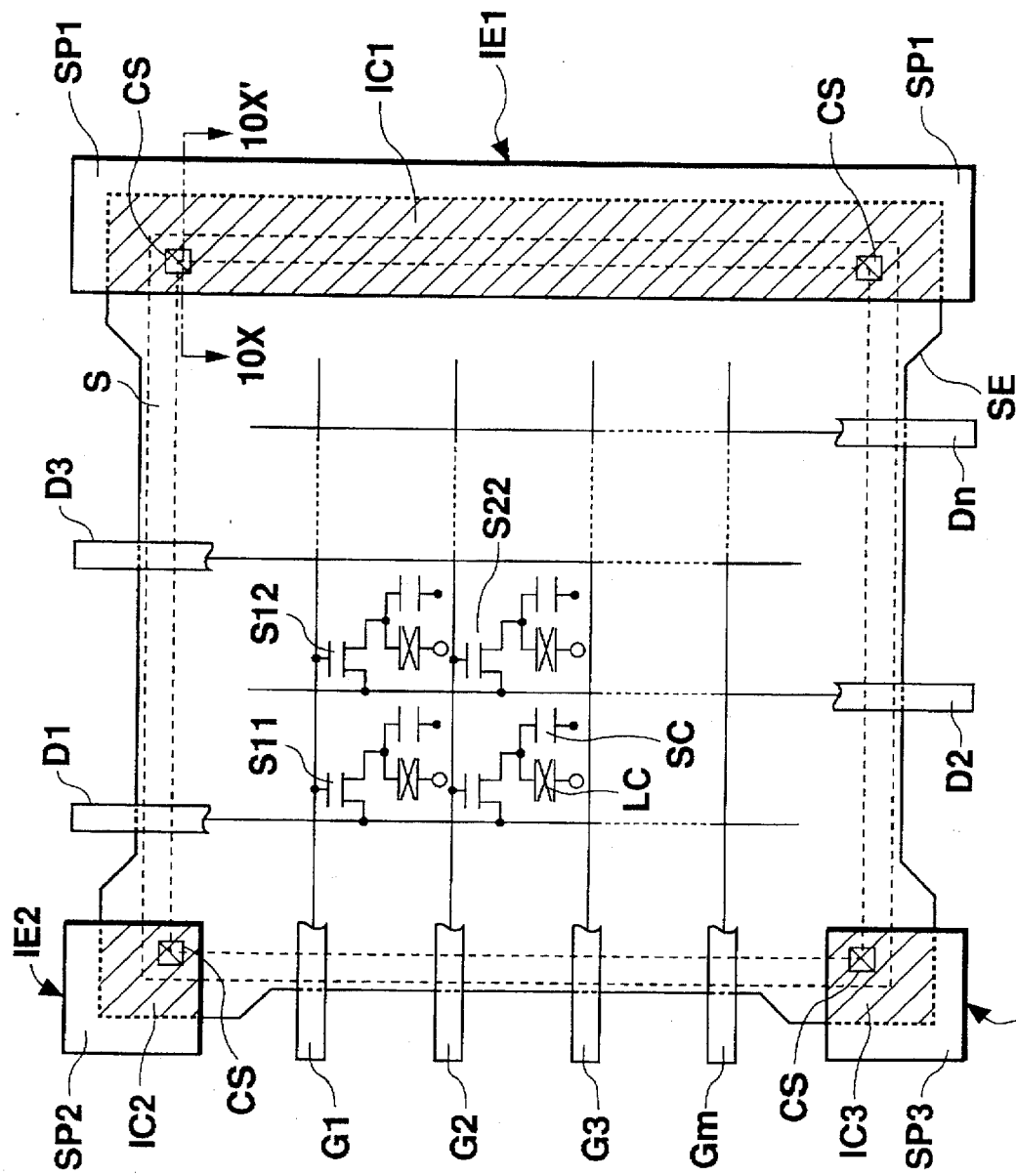
FIG. 10 is a schematic view showing the configuration of liquid crystal displays according to second and third embodiments of the invention.

Embodiment 2:

A liquid crystal display according to a second embodiment will be described with reference to FIG. 10. This liquid crystal display comprises elements similar to those of the first embodiment. Referring to FIG. 10, gate lines G1–Gm and drain lines D1–Dn are arranged such that they are orthogonal to one another. TFTs S11–Smn are formed near intersections of the gate and drain lines, and have their gate and drain electrodes connected to the gate and drain lines G1–Gm and D1–Dn, respectively. In each pixel, the liquid crystal capacitor LC and the storage capacitor SC have two electrodes. One electrode of the liquid crystal capacitor LC is a source electrode of each of TFTs (S11–Smn), and the other electrode is a electrode on a substrate (not shown) lying adjacent to a TFT substrate 10 where the TFTs are disposed, Likewise, one electrode of the storage capacitor SC is the source electrode (i.e. the pixel electrode) of each of TFTs S11–Smn, and other electrode is a storage capacitor electrode SE which is formed on the whole substrate. The storage capacitor electrode SE constitutes a lower electrode of input capacitors IC1–IC3 at the end of the TFT substrate. Input terminals SP1–SP3, which are present at four corners of the TFT substrate 10, constitute a part of the input terminal electrodes IE1–IE3 (upper electrodes) of the input capacitors IC1–IC3. In the input capacitors IC1–IC3, the upper and lower electrodes (i.e. input terminal electrodes IE1–IE3 and the storage capacitor electrode SE) are shorted, by irradiated lasers, in the vicinity of the input terminals SP1–SP3, thereby forming a contact CS. As will be described later, the contact CS is present in an area where a sealant S is used to secure the TFT substrate and an opposed substrate (not shown) forming the opposed electrode thereon, or on the TFT substrate at a position inside where the sealant S is applied such that the contacts CS are not exposed outside the sealant S. The input terminals SP1–SP3 are connected, using a silver paste, to the opposed electrode on the opposed substrate.

Figure 4:
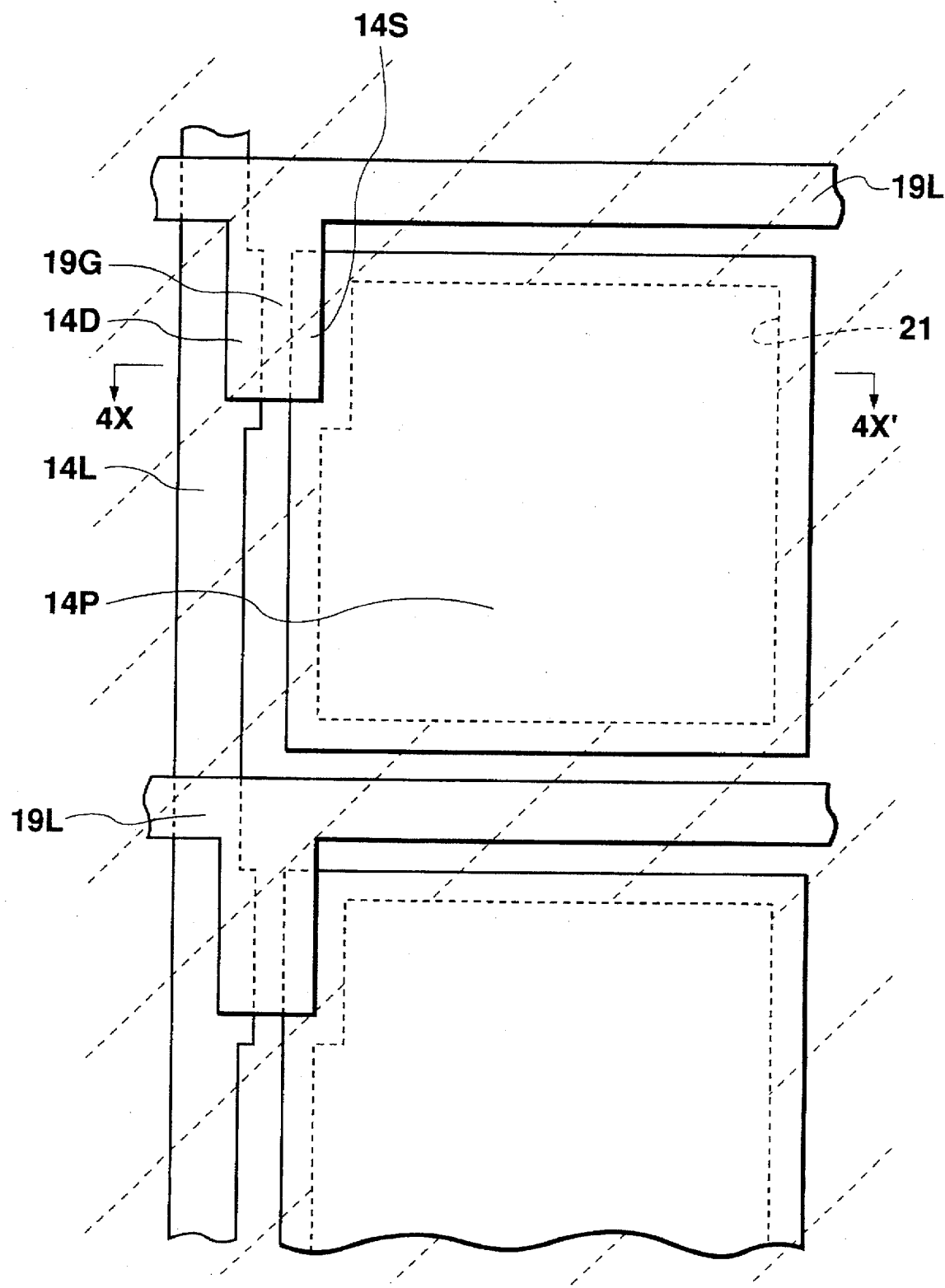
FIG. 4 is a schematic plan view showing the configuration of another conventional TFT substrate.
Figure 5:
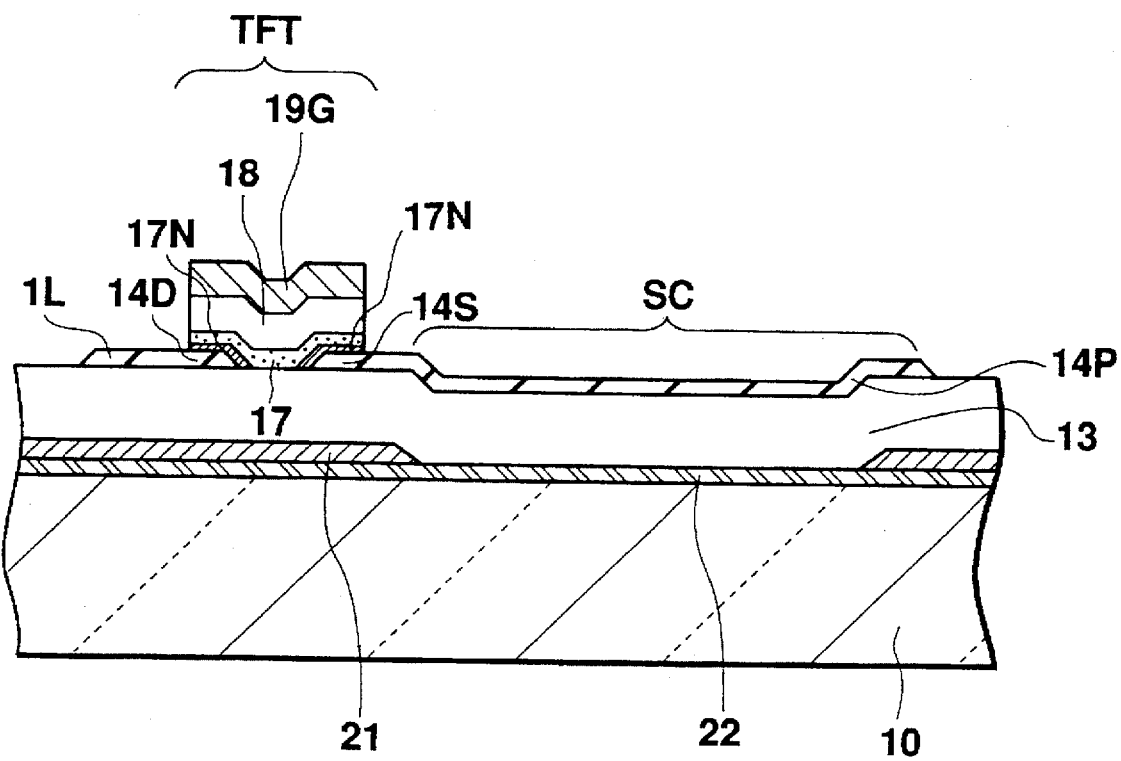
FIG. 5 is a cross section taken along line 4X–4X' in FIG. 4.
Figure 6:
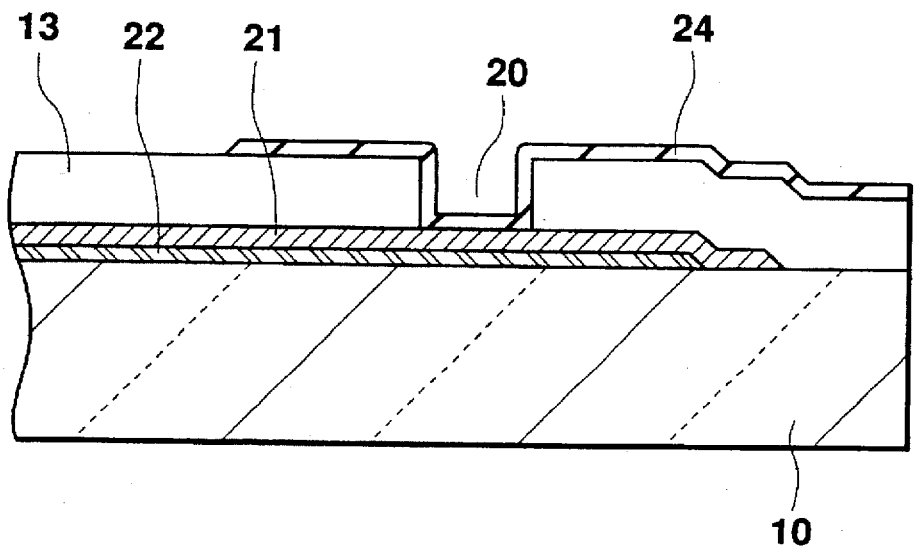
FIG. 6 is a cross section showing one end of the TFT substrate of FIG. 4.
Figure 11:
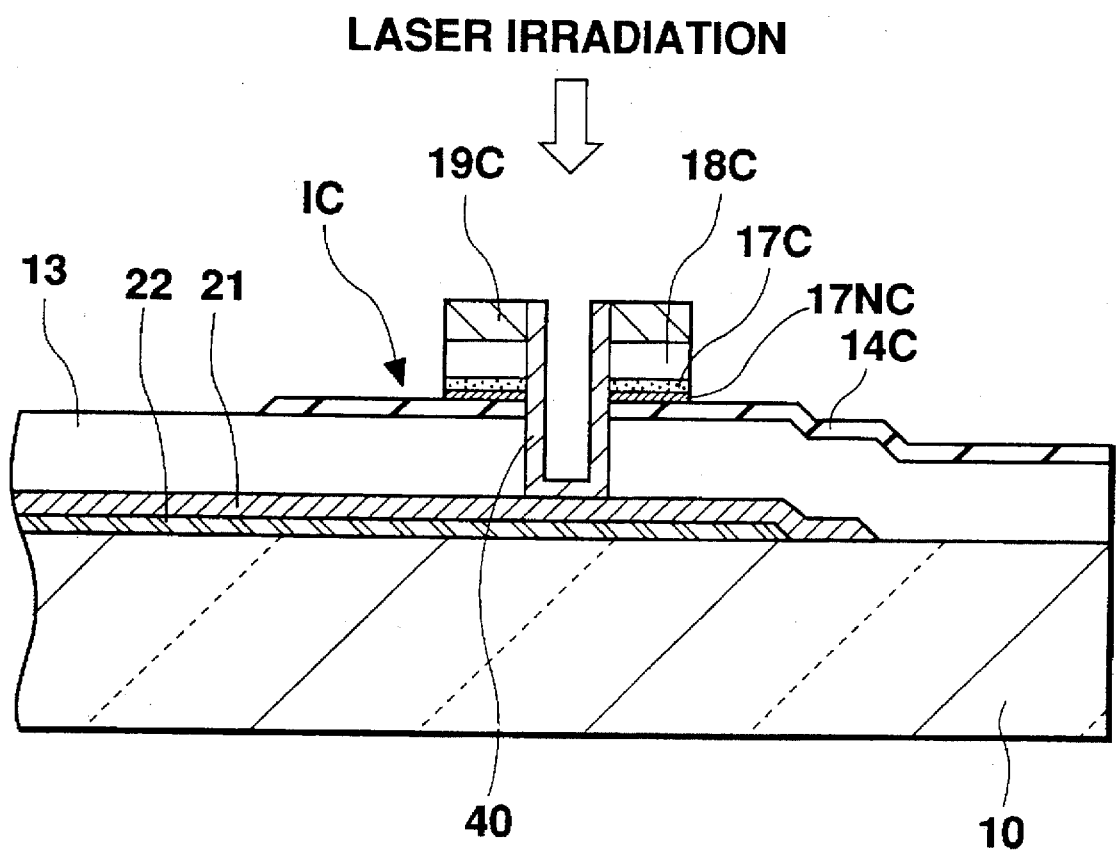
FIG. 11 is a cross section of a TFT substrate of the liquid crystal display of the second embodiment, taken along line 10X–10X' in FIG. 10'.

Referring to FIG. 11, the input capacitors IC1–IC3 will be described with reference to the cross sectional view taken along line 10X–10X' in FIG. 10. FIGS. 4 and 5 are also referred to here, since each pixel on the TFT substrate 10 is structured similarly to that shown in these drawing figures.

A storage capacitor electrode 22 is formed by an ITO metal mask sputtering process, and extends over the TFT substrate 10 made of a transparent glass substrate 10 except for a peripheral edge thereof. A light shielding layer 21 is formed by the Cr sputtering process and photo-etching process on the storage capacitor electrode 22 except for an aperture. The storage capacitor electrode 22 and the light shielding layer 21 are electrically connected, so the light shielding layer 21 is effective in lowering line resistance of the storage capacitor electrode 22 made of ITO having relatively high resistance.

$SiN_x$ is deposited by the CVD process so as to form an insulation layer 13 which covers all over the storage capacitor electrode 22 and the light shielding layer 21, and functions as a dielectric layer for the storage capacitor SC and the input capacitor IC. On the insulation layer 13 are formed a pixel electrode 14P, a source input capacitor electrode (upper electrode) 14C is disposed such that it lies adjacent to a storage capacitor electrode (lower electrode) 22. A part of the upper electrode 14C serves as the input terminal SP as shown in FIG. 10.

Lasers are irradiated down onto the laminate (i.e. layers 17NC, 17C, 18C and 19C) on the input terminal electrode 14C so as to fuse the metal layers (i.e. input terminal electrode 14C and gate electrode 19C) and make contact holes, so as to short circuit the input terminal electrode 14C and the light shielding layer 21. Therefore, the storage capacitor electrode 22 is connected to the input terminal electrode 14c via the contact 40.

An electric field effect, which denotes a voltage variation of the storage capacitor electrode 22 in accordance with capacitance, of the input capacitors IC connected in series with the storage capacitor SC, controls the voltage applied to the storage capacitor electrode 22. Because of a current effect, which denotes a voltage variation of the storage capacitor electrode 22 in accordance with resistance, resulting from the shorting of the input terminal electrode 14C and the storage capacitor electrode 22, charges are directly applied to the storage capacitor SC so as to control the voltage to the storage capacitor electrode 22. Thus, it is possible to reliably control the voltage applied to the storage capacitor electrode 22 even in the structure in which the transparent and conductive storage capacitor electrodes 22 are covered by the pixel electrodes (14P) so as to form the storage capacitors SC.

In operation, when the input capacitors IC are connected in series to the storage capacitors SC, the lower electrode (i.e. storage capacitor electrode) 22 of the input capacitors IC are floating and have no charge. Thus, when a voltage signal is applied to the upper electrode (i.e. input terminal electrode) 14C, the lower electrode 22 remains free of charges. Therefore, the potential of the lower electrode 22 becomes equal to the potential of the upper electrode 14C.

In this state, when a given voltage is applied to the upper electrode 14C connected to a power source, and source electrodes 14S (pixel electrodes 14P) of the active TFTs, electric charges are distributed to the storage capacitor electrodes 22 of each TFT between the upper electrode 14C and source electrode 14S, depending upon capacitance of the storage capacitor SC and input capacitors IC3.

Since the storage capacitor electrode 22 remains floating as described previously, an absolute amount of charges is restricted to 0. Therefore, the voltage applied to the storage capacitors SC of the pixels does not always correspond to a voltage applied to liquid crystal capacitor LC of their corresponding pixels. In other words, a total of charges, which are stored in the storage capacitor electrodes 22 of the pixels in accordance with the voltage applied to the upper electrodes 14C, should be 0. It does not always follow that the charges are uniformly distributed to the storage capacitors SC and liquid crystal capacitors LC. Thus, the voltage holding ratio of the storage capacitors SC may be variable depending upon a level of the voltage applied to the liquid crystal capacitor LC via the TFTs. This prevents the liquid crystal display from improving its image quality as desired. Especially, with the liquid crystal display having the foregoing structure, capacitance of the storage capacitors SC is too large to be negligible, when compared with that of the input capacitors IC. Thus, it becomes very difficult to sufficiently control the voltage of the storage capacitor electrode 22 in accordance with the voltage applied to the upper electrode 14C.

To overcome the foregoing problem, the upper and lower electrodes 14C, 22 constituting the input capacitors IC are shorted by laser irradiation in this embodiment, thereby enabling the storage capacitor electrode 22 to receive charges directly from the upper electrode 14C without the storage capacitor electrode 22 floating. Therefore, the charges are appropriately distributed throughout the storage capacitor electrodes 22 of the pixels in accordance with the storage capacitors SC and input capacitors IC and in accordance with the voltages of the upper electrodes 14C and those of the pixel electrodes 14P.

When the upper and lower electrodes 14C and 22 are shorted, the input capacitors IC includes a parallel connection with a capacitance component and a resistance component. Thus, each input capacitor IC has an impedance of $1/(1+j\omega CR)$, which is smaller than the impedance of $1/j\omega C$ of the input capacitor IC having only the capacitive component. Thus, distortion of signals, which are applied to the upper electrodes 14C and transmitted to the lower electrodes 22, can be reduced. This enables not only quick distribution of charges in the lower electrodes 22 but also quick stabilization of the charges in the lower electrodes 22. Referring to FIG. 10, since the contacts CS of the upper and lower electrodes 14C and 22 are much smaller than the total area of the input capacitors IC, they are structured such that the resistance component caused by the shorting is added in parallel to the capacitance component.

In this embodiment, the upper and lower electrodes 14C and 22 are locally shorted so as to produce the capacitance component and the resistance component, both of which compensate for each other, thereby reducing the total impedance of the input capacitors.

As described above, the larger capacitance the storage capacitors SC has, the larger the electric field effect of the pixel electrodes 14P, and the more difficult it is to control the storage capacitor electrodes 22 with respect to their voltages. According to the present invention, both the electric field effect and the current effect are utilized by the input capacitors so as to control the voltages of the input capacitors IC. Therefore, the charge holding characteristic of the storage capacitor SC can be improved, which prevents the TFTs from leaking signals even if the liquid crystal display is exposed to strong light beams. This indicates that the liquid crystal display is also applicable to a projection TV or the like.

One contact 40 is sufficient for one input capacitor IC. Therefore, four contacts 40 are provided in the vicinity of the storage capacitor input terminals SP. When four contacts 40 are required, they are advantageous from a point of view of manufacturing cost compared with contact holes which are made on the insulation layer 13 by the photo-etching process beforehand.

With the second embodiment, the laminate (of the a-Si, $SiNi_x$ and Al layers 17NC, 17C, 18C, 19C) is formed on the input terminal electrode 14C in accordance with the position of laser irradiation. The laminate is composed of materials which are the same as those of the TFTs. Thus, it is possible to prevent poor contact caused by insufficient contact metal at the contact 40. In other words, the metal is fused by irradiating a laser so as to make a contact hole, through which fused metal is applied, thereby forming the contact 40. However, the ITO layer of the input terminal electrode 14C is too short to make the contact metal reach the storage capacitor electrode 22. To overcome this problem, the foregoing laminate remains on the input terminal electrode 14C. The Al layer of the laminate is used as the contact metal. Further, this laminate is formed simultaneously with the TFTs, which means that the number of masks will not be increased.

The conductive light shielding layer 21 remains on the storage capacitor electrodes 22 constituting the input capacitors IC. Even if laser energy is large, the conductive light shielding layer 21 can prevent the contact hole from penetrating the storage capacitor electrode 22, and poor contacting.

As described with reference to FIG. 10, the contact 40 is made in the area where the sealant S is applied, or on the substrate inside the area where the sealant S is applied, thereby preventing the contact 40 from being exposed out of the substrate after a liquid crystal display panel is assembled. The contact 40 is formed as described previously, and is very thin metal. Therefore, if the contact 40 is present outside the sealant S and is exposed to moisture, there may be a cell between the contact 40 and other terminal electrodes, which causes metal of the contact 40 to be dissolved, and poor contacting or disconnection. This problem will result in reduced quality and life of the device. To overcome this problem, the contact 40 is positioned in the area where the sealant S is applied or inside the area where the sealant S is applied. Once the display panel is assembled, the contact 40 is isolated from the atmosphere.

Figure 12:
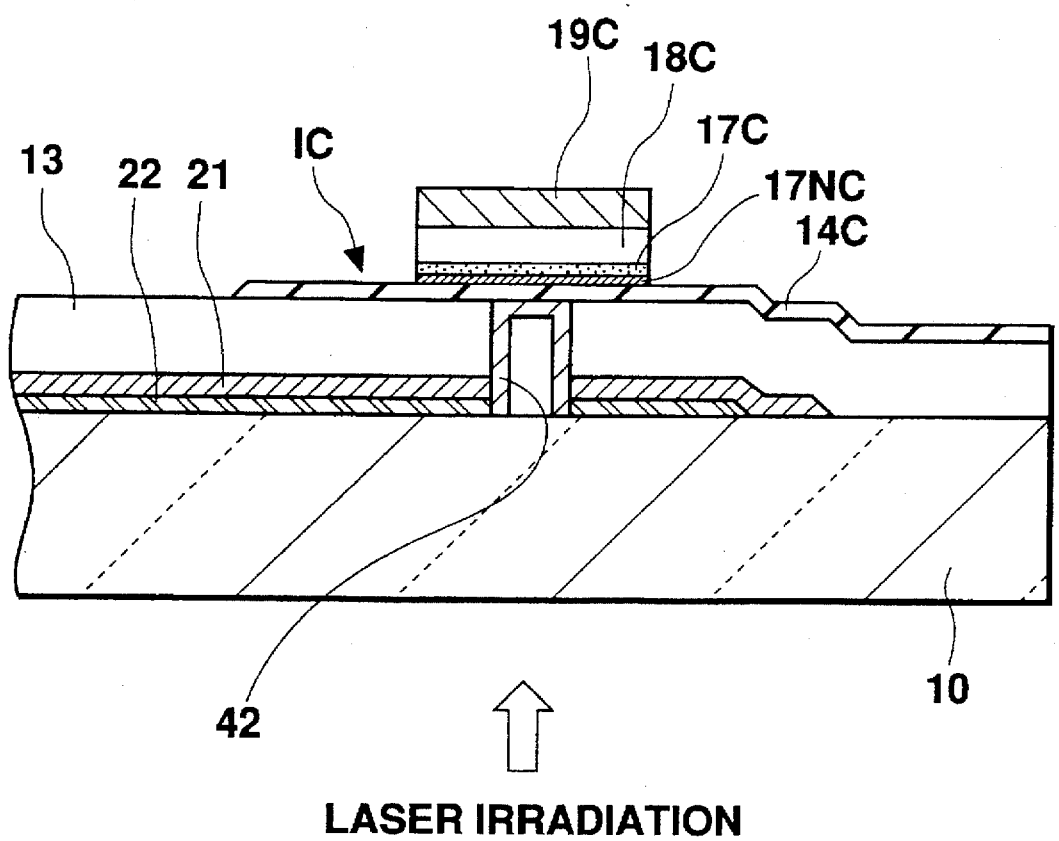
FIG. 12 is a cross section of a TFT substrate of the liquid crystal display of the third embodiment, taken along line 10X–10X' in FIG. 10.

Embodiment 3:

A third embodiment of the invention will be described with reference to FIG. 12, which is a cross section of a contact 42 of an input capacitor IC. This cross section corresponds to the cross section taken along line 10X–10X' in FIG. 10. The third embodiment differs from the second embodiment in that the contact 42 is made by irradiating a laser via a substrate 10, i.e. from an underside of the input capacitor IC. This embodiment is applicable if laser irradiation cannot be performed from an upper side of the input capacitor IC due to design restrictions or a manufacturing process. A conductive light shielding layer 21 is disposed on a storage capacitor electrode 22. The light shielding layer 21 increases an amount of metal for the contact 42. When a laser is irradiated to the light shielding layer 21 and the storage capacitor electrode 22, a contact hole is made in an insulating layer 13, and fused metal flows into the contact hole, reaching the input terminal electrode 14C, and forming the contact 42. This embodiment is advantageous in that laser can be irradiated via a rear side of an area where a sealant S is applied, after the liquid crystal display is assembled. Thus, the contact 42 can be easily made. Further, the contact 42 can be selectively made at a desired position since the liquid crystal panel is sealed.

Similarly to the second embodiment, a laminate of layers 17NC, 17C, 18C and 19C, which is the same as a TFT, is present on the input terminal electrode 14C such that the contact 42 may not come loose from the laminate. This arrangement protects the contact 42 from being exposed to the atmosphere and being corroded by cell action which is caused because the contact and other metal terminals or the like may cooperate to form a cell. Even when a position of the contact 42 is limited due to a designing or manufacturing process, the contact 42 can be protected. In other words, even if the contact 42 cannot be made in the area where the sealant S (60) is applied or inside such an area, the contact 42 can be protected against aging, preventing reduced quality or life of the device.

Figure 13:
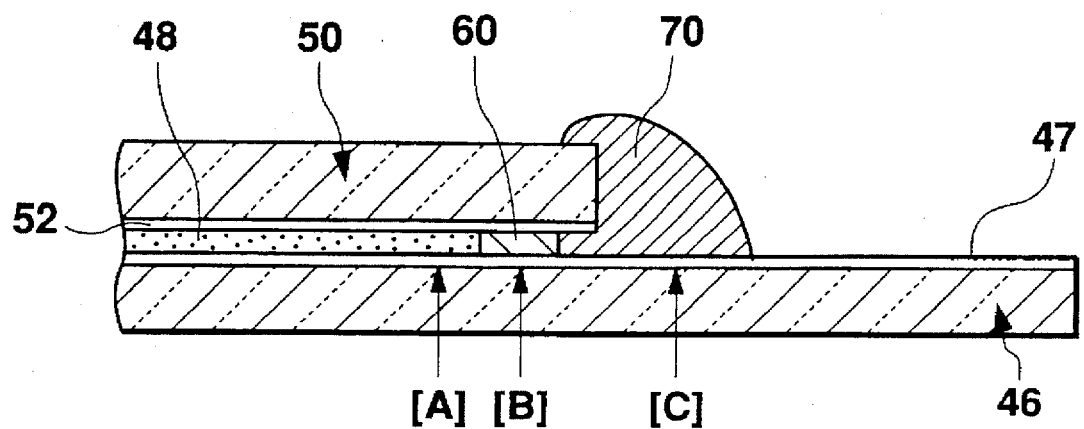
FIG. 13 is a cross section of one end of each of the TFT substrates of the second and third embodiments.

FIG. 13 shows a cross section of substrates 46 and 50 at one end thereof. Specifically, the substrate 46 forming TFTs and pixel electrodes are put together with the substrate 50 forming an opposed electrode 52 on the surface of the substrate 50 with a liquid crystal layer 48 interposed therebetween, thereby obtaining a liquid crystal display panel. The sealant S (60) is used to bond the substrates 46 and 50. The sealant S (60) is covered by a protection layer 70 of silicone or epoxide such that not only can the liquid crystal layer 40 be reliably sealed between the substrates 46 and 50 but also can various terminal electrode lines 47 exposed on the substrate 46 be protected. With the second and third embodiments, the contact CS shown in FIG. 10 is made at the position [A] or [B]. Alternatively, the contact may be made at the position [C]. Since the position [C] is covered by the moisture-proof protection layer 70, the contact CS at the position [C] can be isolated from the atmosphere. Further, the contact at the position [C] can be freely made by irradiating a laser either from above or from under the substrate 46, even after the liquid crystal display panel is assembled.

In the second and third embodiments, the input capacitor IC1 is positioned along the side of the substrate which is opposite to the side to which the gate lines G1–Gm extend for connection with an external unit. On the contrary, the input capacitors IC2 and IC3 are positioned at corners on the side opposite to where the IC1 is present. The opposite ends of the input capacitor IC1 and parts of the input terminal electrode 14C where the input capacitors IC1–IC3 are positioned serve as the input terminals SP. It has been ascertained, based on visual inspection during experiments, that the total capacitance of the input capacitors IC1–IC3 should be at least one-tenth of the total capacitance of the storage capacitor SC. This capacitance is a maximum accomplished by the input capacitors IC1–IC3 which are formed on the peripheral margin of the substrate. It has not been confirmed that image quality is lowered due to delay or loss of signal voltages applied to the storage capacitor electrode 22 because the contact CS is formed by shorting the input terminal electrodes IC1–IC2.

According to the present invention, a signal voltage to the storage capacitor 22 is controlled via the input terminals SP and the input capacitors, so it is not necessary to make a contact hole in the insulation layer 13, which means a reduction of one photo-etching process. In the second and third embodiments, a minimum of one contact CS is made on one input capacitor by the shorting process. Thus, it is possible to appropriately control the voltage of the storage capacitor electrode even when the storage capacitor SC has a large capacitance.

The number of masks for manufacturing the substrate carrying the TFTs of the foregoing structure is three at maximum, i.e. one for patterning the light shielding layer 21, one for patterning the input terminal electrode 14C, and one for patterning the gate electrode line 19L.

In the second and third embodiments, the input terminal electrodes and the storage capacitor electrodes are connected by laser irradiation. The connection between these members is not limited to such a one. Alternatively, as in the first embodiment, the input capacitor can be realized using the input terminal electrode and the storage capacitor electrode without connecting these electrodes. It is possible to control the voltage of the storage capacitor electrode by applying a voltage signal to the storage capacitor electrode (e.g. a signal whose potential is equal to that of the opposed electrode on the opposed substitute) via the input capacitor. However, such an arrangement may cause signal delay or the like since the capacitance of the storage capacitor is relatively large in the second and third embodiments compared with that of the first embodiment. This arrangement is still advantageous in that the storage capacitor can be controlled without increasing the number of masks to be used. On the contrary, in the first embodiment, it is possible to connect the input terminal electrode and the storage capacitor electrode by laser irradiation. In the embodiments of the present invention, the pixel electrodes are arranged in a straight array of the rows and columns as shown in FIG. 4, or are arranged with a half pitch shifted per line as shown in FIG. 9. Alternatively, they may be arranged in any other array.

With the second and third embodiments, application of a desired voltage or current signal to the input terminal electrode enables direct application of not only the voltage to the storage capacitor electrode but also charges to the storage capacitor electrode. This not only improves quality of displayed images but also reduces the number of masks to be used in the manufacturing process. Thus, the liquid crystal display can be manufactured at a reduced cost. Further, since the storage capacitor is as large as a pixel, it is possible to improve charge holding characteristic by increasing the capacitance of the storage capacitor. The liquid crystal displays according to the second and third embodiments can display appropriate images even when they are applied in a very bright environment, which enables the liquid crystal display to be used in conjunction with a projection TV.

What is claimed is:

1. A liquid crystal display with storage capacitors for holding charges, comprising:

(a) a plurality of pixel electrodes arranged, on a substrate, in matrix array;

(b) drain lines formed between columns of the pixel electrodes;

(c) gate lines formed between rows of the pixel electrodes;

(d) thin film transistors formed near intersections of the drain lines and the gate lines, each thin film transistor including a source electrode connected to each pixel electrode, a drain electrode connected to each drain line, and a gate electrode connected to each gate line;

(e) storage capacitor electrodes disposed lying adjacent to the pixel electrodes with an insulation layer sandwiched therebetween;

(f) storage capacitors constituted by the pixel electrodes and the storage capacitor electrodes;

(g) an input terminal electrode for the storage capacitors disposed at an end of the substrate;

(h) storage capacitor lines connected to the storage capacitor electrodes and extending to an end of the substrate to connect to a common capacitor electrode; and (i) an input capacitor formed by the common capacitor electrode and the input terminal electrode opposing the common capacitor electrode through the insulation layer interposed in between the common capacitor electrode and the input terminal electrode, wherein voltages applied to the storage capacitor electrodes are controlled by signals supplied to the input terminal electrode via the input capacitor.

2. The liquid crystal display as in claim 1, wherein each of the gate lines carries the insulation layer and the semiconductor layer on its underside, each source electrode is constituted by a part of each pixel electrode, each drain electrode is constituted by a part of each drain line, a channel layer which is a part of the semiconductor layer and is positioned at an area where the source electrode and the drain electrode lie adjacent to each other, a gate insulation layer which is a part of the insulation layer and extends over the channel layer, and each gate which is a part of the gate line and extends over the gate insulation layer.

3. The liquid crystal display as in claim 2, wherein the input terminal electrode is made of the same transparent conductive layer constituting the pixel electrodes and the drain lines.

4. The liquid crystal display as in claim 1, wherein the input terminal electrode is disposed at a corner or a side of the substrate, or both a corner and a side of the substrate.

5. The liquid crystal display as in claim 1, wherein each storage capacitor electrode is disposed lying adjacent to each pixel electrode with the insulation layer interposed therebetween around the pixel electrode, and storage capacitor electrodes which are on the same rows and columns of pixel electrodes adjoining each other are mutually connected.

6. The liquid crystal display as in claim 5, wherein the storage capacitor electrode is constituted by a part of a light shielding layer on the substrate.

7. The liquid crystal display as in claim 1, wherein the storage capacitor electrodes are made of a transparent conductive layer extending all over the substrate.

8. The liquid crystal display as in claim 1, wherein an input capacitor has a capacitance which is 1/10 of the total capacitance of all the storage capacitors on the substrate.

9. A liquid crystal display with storage capacitors for holding charges, comprising:

a plurality of pixel electrodes arranged, on a substrate, in matrix array;

drain lines formed between columns of the pixel electrodes;

gate lines formed between rows of the pixel electrodes;

thin film transistors formed near intersections of the drain lines and the gate lines, each thin film transistor including a source electrode connected to each pixel electrode, a drain electrode connected to each drain line, and a gate electrode connected to each gate line;

storage capacitor electrodes disposed lying adjacent to the pixel electrodes with an insulation layer sandwiched therebetween;

storage capacitors constituted by the pixel electrodes and the storage capacitor electrodes;

an input terminal electrode for the storage capacitors disposed at an end of the substrate; and an input capacitor constituted by the storage capacitor electrode and the input terminal electrode, and having a capacitance which is 1/10 of the total capacitance of all the storage capacitors on the substrate, wherein the storage capacitor electrodes extend to an end of the substrate such that the storage capacitor electrode is disposed lying adjacent to the input terminal electrodes with the insulation layer interposed therebetween, and voltages applied to the storage capacitor electrodes are controlled by signals supplied to the input terminal electrodes.

10. The liquid crystal display as in claim 9, wherein each storage capacitor electrode is provided for each pixel electrode, each storage capacitor electrode is connected to a common capacitor electrode present at the one end of the substrate, and the input capacitor is constituted by the common capacitor electrode and the input terminal electrode which is formed on the common capacitor electrode via the insulation layer.

11. A liquid crystal display with storage capacitors for retaining charges, comprising:

(a) a plurality of pixel electrodes arranged, on a substrate, in matrix array;

(b) drain lines formed between columns of the pixel electrodes;

(c) gate lines formed between rows of the pixel electrodes;

(d) thin film transistors formed near intersections of the drain lines and the gate lines, each thin film transistor including a source electrode connected to the pixel electrode, a drain electrode connected to the drain line, and a gate electrode connected to the gate line;

(e) storage capacitor electrode disposed lying adjacent to the pixel electrodes with an insulation layer sandwiched therebetween;

(f) storage capacitors constituted by the pixel electrodes and the storage capacitor electrode;

(g) an input terminal electrode for the storage capacitors disposed at an end of the substrate;

(h) an input capacitor formed by the storage capacitor electrode extending to an end of the substrate and the input terminal electrode opposing the storage capacitor electrode through the insulation layer interposed in between the storage capacitor electrode and the input terminal electrode; and (i) a resistance formed by shorting the input terminal electrode and the storage capacitor electrode, wherein voltages applied to the storage capacitor electrode are controlled by signals supplied to the input terminal electrode via the input capacitor and the resistance.

12. The liquid crystal display as in claim 11, wherein the input terminal electrode and the storage capacitor electrode are shorted by a laser irradiated from a side of the input terminal electrode or the storage capacitor electrode after formation of the foregoing electrodes and the insulation layer such that the resistance is added in parallel to the input capacitor.

13. The liquid crystal display as in claim 12, wherein each gate line carries the insulation layer and a semiconductor layer on its underside;

each source electrode is constituted by a part of each pixel electrode;

each drain electrode is constituted by a part of each drain line;

a channel layer which is a part of the semiconductor layer and is positioned at an area where the source electrode and the drain electrode lie adjacent to each other; and a gate insulation layer which is a part of the insulation layer and extends over the channel layer.

14. The liquid crystal display as in claim 13, wherein the storage capacitor electrode is constituted by a transparent conductive layer laid over the substrate.

15. The liquid crystal display as in claim 14, wherein a light shielding layer is formed on the storage capacitor electrode around each pixel electrode, the light shielding layer is connected to the storage capacitor electrode and extends to the end of the substrate where the laminate is present over the input terminal electrode, and the input terminal electrode and the storage capacitor electrode are shorted at an area where the laminate and the light shielding layer are provided.

16. The liquid crystal display as in claim 15, wherein the input terminal electrode and the storage capacitor electrode are shorted by a laser irradiated from a side of the storage capacitor electrode or the laminate such that the resistance is added in parallel to the input capacitor.

17. The liquid crystal display as in claim 12, wherein the resistance is parallel to the input capacitor so that a total impedance of the input capacitor is reduced, thereby increasing the voltages applied to the storage capacitors.

18. The liquid crystal display as in claim 13, wherein a laminate of the semiconductor layer, the insulation layer and the same metal layer as the gate line is laid over the input terminal electrode, and the input terminal electrode and the storage capacitor electrode are shorted within an area of the laminate.

19. The liquid crystal display as in claim 18, wherein the input terminal electrodes and the storage capacitor electrodes are shorted by a laser irradiated from a side of the laminate or from a side of the storage capacitor electrode such that the resistance is added in parallel to the input capacitor.

20. The liquid crystal display as in claim 19, wherein a light shielding layer is formed on the storage capacitor electrode around each pixel electrodes, the light shielding layer is connected to the storage capacitor electrode and extends to the end of the substrate where the laminate is present over the input terminal electrode, and the input terminal electrode and the storage capacitor electrode are shorted where the laminate and the light shielding layer are formed.

21. The liquid crystal display as in claim 20, wherein the shorted portion of the input terminal electrode and the storage capacitor electrode is present within an area in which a sealant is used to bond the substrate and an opposing substrate together with a liquid crystal layer interposed in between the substrate and the opposing substrate, and in which a protection layer covers the sealant.

22. The liquid crystal display as in claim 12, wherein the resistance is parallel to the input capacitor so that a total impedance of the input capacitor is reduced, thereby increasing an amplitude of signal voltages applied to the storage capacitors.

23. A liquid crystal display with storage capacitors for retaining charges, comprising:

a plurality of pixel electrodes arranged, on a substrate, in matrix array;

drain lines formed between columns of the pixel electrodes;

gate lines formed between rows of the pixel electrodes;

thin film transistors formed near intersections of the drain lines and the gate lines, each thin film transistor including a source electrode connected to the pixel electrode, a drain electrode connected to the drain line, and a gate electrode connected to the gate line such that each gate line carries the insulation layer and a semiconductor layer on its underside, each source electrode is constituted by a part of each pixel electrode, each drain electrode is constituted by a part of each drain line, a channel layer is a part of the semiconductor layer and is positioned at an area where the source electrode and the drain electrode lie adjacent to each other and a gate insulation layer is a part of the insulation layer and extends over the channel layer;

storage capacitor electrode disposed lying adjacent to the pixel electrodes with an insulation layer sandwiched therebetween;

storage capacitors constituted by the pixel electrodes and the storage capacitor electrode; and an input terminal electrode for the storage capacitors disposed at an end of the substrate, wherein the storage capacitor electrode extend to an end of the substrate where the storage capacitor electrode is disposed adjacent to the input terminal electrode with the insulation layer interposed therebetween, a laminate of the semiconductor layer, the insulation layer and the same metal layer as the gate line is laid over the input terminal electrode, the input terminal electrode and the storage capacitor electrode are shorted within an area of the laminate, and voltages applied to the storage capacitor electrode are controlled by signals supplied to the input terminal electrode.

24. The liquid crystal display as in claim 23, wherein the input terminal electrodes and the storage capacitor electrodes are shorted by a laser irradiated from a side of the laminate or from a side of the storage capacitor electrode.

25. The liquid crystal display as in claim 24, wherein a light shielding layer is formed on the storage capacitor electrode around each pixel electrode, the light shielding layer is connected to the storage capacitor electrode and extends to the end of the substrate where the laminate is present over the input terminal electrode, and the input terminal electrode and the storage capacitor electrode are shorted where the laminate and the light shielding layer are formed.

26. The liquid crystal display as in claim 25, wherein the shorted portion of the input terminal electrode and the storage capacitor electrode is present within an area in which a sealant is used to bond the substrate and an opposing substrate together with a liquid crystal layer interposed in between the substrate and the opposing substrate, and in which a protection layer covers the sealant.

27. A liquid crystal display with storage capacitors for retaining charges, comprising:

a plurality of pixel electrodes arranged, on a substrate, in matrix array;

drain lines formed between columns of the pixel electrodes;

gate lines formed between rows of the pixel electrodes;

thin film transistors formed near intersections of the drain lines and the gate lines, each thin film transistor including a source electrode connected to the pixel electrode, a drain electrode connected to the drain line, and a gate electrode connected to the gate line such that each gate line carries the insulation layer and a semiconductor layer on its underside, each source electrode is constituted by a part of each pixel electrode, each drain electrode is constituted by a part of each drain line, a channel layer is a part of the semiconductor layer and is positioned at an area where the source electrode and the drain electrode lie adjacent to each other and a gate insulation layer is a part of the insulation layer and extends over the Channel layer;

storage capacitor electrode disposed lying adjacent to the pixel electrodes with an insulation layer sandwiched therebetween;

the storage capacitor electrode constituted by a transparent conductive layer laid over the substrate;

storage capacitors constituted by the pixel electrodes and the storage capacitor electrode;

a light shielding layer formed on the storage capacitor electrode around each pixel electrode, the light shielding layer connected to the storage capacitor electrode and extending to the end of the substrate where the laminate is present over the input terminal electrode, and the input terminal electrode and the storage capacitor electrode are shorted at an area where the laminate and the light shielding layer are provided; and an input terminal electrode for the storage capacitors disposed at an end of the substrate, wherein the storage capacitor electrode extend to an end of the substrate where the storage capacitor electrode is disposed adjacent to the input terminal electrode with the insulation layer interposed therebetween, and voltages applied to the storage capacitor electrode are controlled by signals supplied to the input terminal electrode.

28. The liquid display as in claim 27, wherein the input terminal electrode and the storage capacitor electrode are shorted by a laser irradiated from a side of the storage capacitor electrode or the laminate.

* * * * *